Patented May 5, 1936

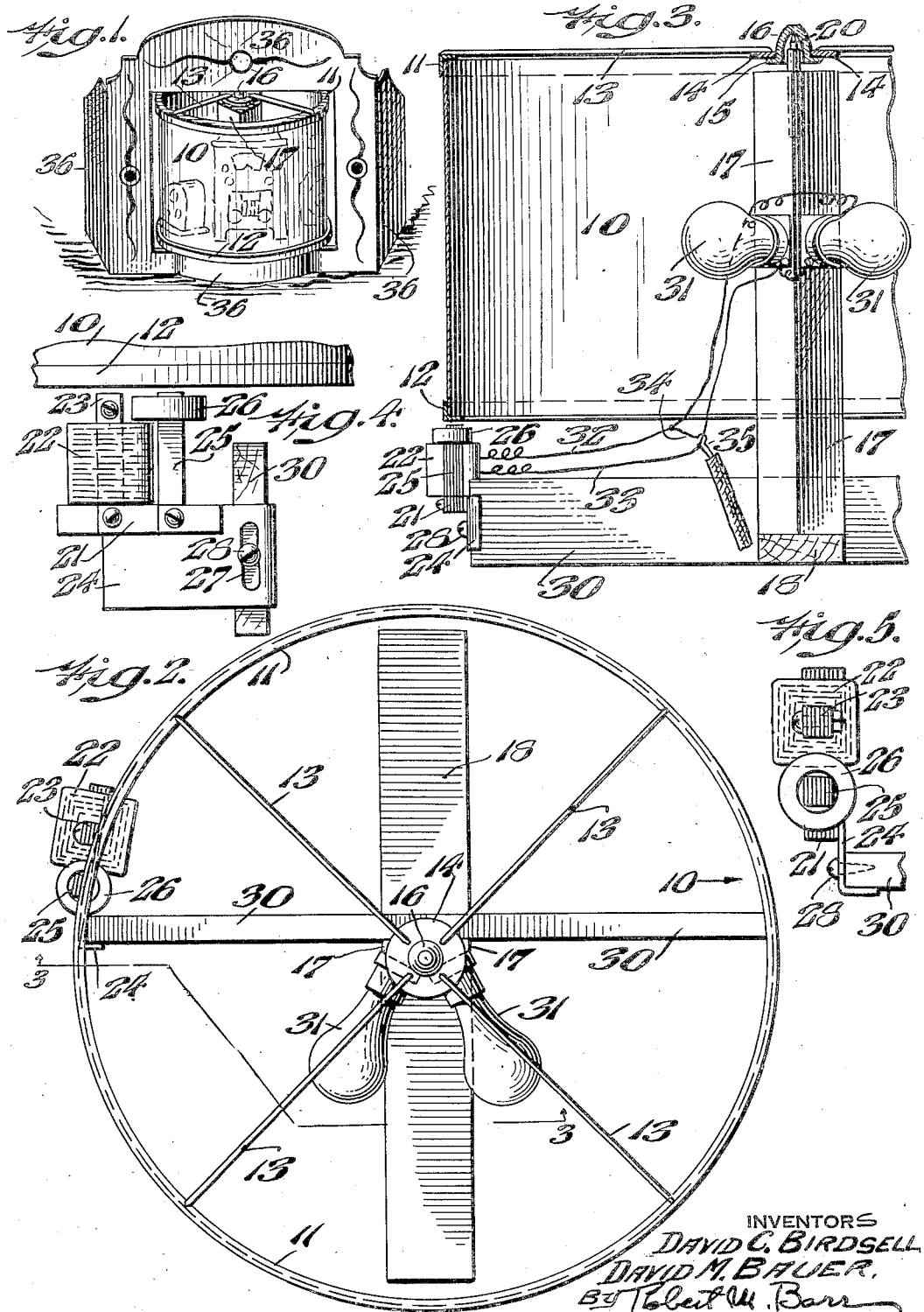

2,039,770

UNITED STATES PATENT OFFICE 2,039,770

DISPLAY DEVICE

David C. Birdsell, Enfield, and David M. Bauer, Norristown, Pa.

Application December 6, 1934, Serial No. 756,204

3 Claims. (Cl. 40—33)

The present invention relates to display devices for advertising or other purposes and more particularly to a movable display for instantly attracting attention.

Some of the objects of the present invention are to provide a novel display device; to provide a display device including a plurality of scenes, advertisements or other illustrating matter, which pass successively across the field of vision; to provide a display device in the form of a tubular body mounted for rotation and wherein the motive power or operating adjuncts are concealed from view; to provide a rotatable device wherein the motive power is obtained from a novel unit spaced from and unconnected with the device; to provide an illuminated display device arranged to be rotated at a suitable speed; to provide an electrically controlled motive unit wherein provision is made for regulating the speed of an associated rotatable display device; to provide a rotatable display device driven by a novel magnetic flux generating unit; to provide an improved one point bearing for rotatable display devices; and to provide other improvements as will hereinafter appear.

In the accompanying drawing Fig. 1 represents a perspective of a display device embodying one form of the present invention; Fig. 2 represents a plan of the same on an enlarged scale; Fig. 3 represents a section on line 3—3 of Fig. 2; Fig. 4 represents a detail in side elevation of the motor unit and associated parts; and Fig. 5 represents a plan of the motor part of Fig. 4.

Referring to the drawing one form of the present invention consists of a tubular body 10 here shown as of cylindrical shape and open at the top and bottom. Preferably the body 10 is made of transparent material, though this is not always essential, fastened to and stretched between top and bottom rings 11 and 12.

For bracing and supporting the body 10, relatively rigid stays 13 are provided which radiate from an axially disposed collar 14 and join the ring 11 at suitably spaced intervals. This collar 14 is arranged to seat upon the flange 15 of a bearing member 16 which is of inverted cup-shape and preferably molded out of glass as that has been found to reduce friction to a minimum, though any other material having a low-coefficient of friction may be successfully employed. The internal shape of the member 16 is that of a cone so dimensioned that the actual bearing is focussed at one relatively small point.

For supporting the member 16 a standard 17 is provided which rises coaxially with the body 10 from a fixed base 18 and terminates at its upper end in a bearing support 20. Preferably this support 20 is of self-lubricating material, such as a graphitic composition, having a conical end to enter the member 16 and allow the latter to seat thereon. This composition is of sufficient hardness to resist wear. The shape and size of the support 20 leaves an annular clearance between it and the member 16 so that there is no frictional drag as the member 16 turns about the end of the support 20 as a pivot. By thus reducing the bearing support to the dimension of a point losses by friction become negligible while by including graphite in the composition of the support the mounting becomes self-lubricating.

As a means for rotating the body 10 the preferred embodiment of the invention comprehends causing a torque to be applied to the body, which torque is developed by the magnetic flux created by a novel electrical unit. As here shown this unit consists of a magnetic core 21 of U-shape having a field 22 wound on the leg 23 thereof which is arranged to be energized from a suitable source of alternating current. Preferably the core 21 is of laminated construction bolted together and fixed to a mounting plate 24. The other leg 25 of the core 21 has its free end encircled by a shading coil 26 formed of one piece of heavy copper. This coil 26 under the current induced therein produces a magnetic flux differing from that produced as a result of the current induced in the field wound leg 23 so that the resultant effect is to produce a rotating field which if cut by an armature freely rotatable will cause the latter to rotate. In the present instance the armature is the ring 12 at the lower end of the body 10 and in order that it may respond as an armature it is made of soft iron or other magnetizable material. In mounting the unit the free ends or poles of the core 21 are positioned below and in close proximity to the ring 12 and preferably in such position that the axis of the shaded pole is juxtaposed with respect to the bottom of the ring 12. In connection with this arrangement it should be observed that the speed of rotation of the body 10 depends upon the length of the air-gap between the pole of the leg 25 and the armature ring 12. The longer the air-gap the slower the speed of rotation of the body, and for the present purpose the air-gap is set to rotate the body 10 four revolutions per minute.

For adjusting the aforesaid air-gap as required, the plate 24 is provided with a vertically disposed slot 27 to receive a set screw 28 for fastening the plate 24 to a cross bar 30 forming an extension of the base 18. By loosening the screw 28 the plate 24 can be moved towards or away from the ring 12 and thus definitely fix the length of the air-gap as desired. Once so fixed it remains as long as the adjusting screw 28 is tight.

In order to illuminate the body 10 one or more lamps 21 can be attached to the standard 17 preferably in a horizontal position and about the central portion thereof so that the light is uniformly diffused to the body 10. Conductors 32 and 33 lead to the winding 22 and the lamps 31 and receive current from supply leads 34 and 35 energized from a suitable source of alternating current.

In use the device, as above described, is assembled with a cut-out frame 36 through which a portion of the body 10 is visible for display purposes. Preferably the frame 36 fits relatively close about the body 10 so that the operating motor and other undesirable parts are concealed when the device is on display.

It will now be apparent that a complete unitary display device has been devised which is simple in construction, effective as a unique display, and economical in operation. By the novel bearing suspension of the rotatable body, wear is reduced to a minimum and becomes a negligible factor. Also by the provision of an original motor drive, the rotatable body is caused to rotate at a uniform speed so regulated as to permit the full inspection and reading of pictures, legends or other matter upon the body.

In the foregoing the preferred form of the invention has been described but this is to be understood as only one example of the construction, and that the invention is not restricted to the precise details set forth, while the claims are to be interpreted in a broad sense.

Having thus described our invention, we claim:—

1. A display device comprising a frame, an upright member on the frame, a spider pivotally mounted upon said upright member for free rotation, a circular band affixed to the outer ends of the arms of said spider, a cylindrical display surface extending downwardly from said band, a circular iron band attached to the bottom of said surface, a U-shaped electromagnet mounted on said frame with its poles near the iron band, a shading coil around one of said poles, means to energize the magnets to rotate the iron band and display surface and means permitting the distance between the magnet and the band to be varied to adjust the speed of rotation.

2. A display device comprising a frame, a bearing support on said frame, a bearing carried on said support and carrying in turn a horizontal spider member, the said bearing and spider member being freely rotatable, a cylindrical display surface mounted on the ends of the spider member and extending downwardly therefrom, a metal ring affixed to the lower edge of the display surface and electric motor means adjacent the ring and operative to rotate the ring and the parts connected thereto.

3. A display device comprising a frame, an upright member on the frame, a rotatable supporting member pivotally mounted upon the upright member, a cylindrical display surface depending from said supporting member, a metal ring attached to said display surface near the lower edge thereof, a pair of electro-magnetic poles near said ring, means to alter the field of one of the poles and means to energize the poles to rotate the metal ring and the parts connected thereto.

DAVID C. BIRDSELL.
DAVID M. BAUER.